United States Patent [19]
Martinez

[11] Patent Number: 6,078,015
[45] Date of Patent: Jun. 20, 2000

[54] ACTUATOR FOR POWER SWITCH IN A LAWN AND GARDEN CARE APPLIANCE

[75] Inventor: David M. Martinez, Brunswick, Ohio

[73] Assignee: MTD Products Inc, Cleveland, Ohio

[21] Appl. No.: 09/010,713

[22] Filed: Jan. 22, 1998

[51] Int. Cl.[7] .............................. H01H 9/06; A01D 75/28
[52] U.S. Cl. ...................... 200/61.85; 56/10.5; 200/332.2
[58] Field of Search ................ 200/61.62, 61.85, 200/329–332.2, 335–337, 61.41, 61.42; 56/10.2 R–16.7, DIG. 15

[56] References Cited

U.S. PATENT DOCUMENTS

| | | | |
|---|---|---|---|
| 3,243,565 | 3/1966 | Sutton | 200/332 |
| 3,980,068 | 9/1976 | Karsten et al. | 56/DIG. 15 |
| 3,982,082 | 9/1976 | Thorud et al. | 56/16.7 X |
| 4,044,532 | 8/1977 | Lessig, III | 200/331 X |
| 4,167,221 | 9/1979 | Edmonson et al. | 56/10.2 R X |
| 4,186,287 | 1/1980 | Scott | 200/332 |
| 4,213,513 | 7/1980 | Beck | 200/61.85 X |
| 4,275,280 | 6/1981 | Yamazaki | 200/61.85 |
| 4,284,865 | 8/1981 | Nicholson | 200/322.2 |
| 4,614,848 | 9/1986 | Schulte et al. | 200/61.85 |
| 4,857,681 | 8/1989 | Rush, Jr. et al. | 200/332.2 |

*Primary Examiner*—J. R. Scott
*Attorney, Agent, or Firm*—Emerson & Associates; Roger D. Emerson; Timothy D. Bennett

[57] ABSTRACT

An electric switch operating mechanism is disclosed for use with an electric lawn care appliance. The lawn care appliance has a housing, a switch and a movable bail which can be biased between active and inactive positions. An actuator is juxtaposed in between the bail and the switch. When the bail is moved to its active position, it causes the actuator to actuate the switch. The actuator has an engagement surface that engages with the bail to activate the mechanism. The switch further contains a button which enables the bail to engage the actuator.

9 Claims, 4 Drawing Sheets

6,078,015

ACTUATOR FOR POWER SWITCH IN A LAWN AND GARDEN CARE APPLIANCE

BACKGROUND OF THE INVENTION

I. Field of the Invention

This invention relates to a switch for an electric lawn and garden appliance and, more particularly in the preferred embodiment, to a switch for a powered electric mower.

II. Description of the Related Art

Electric powered mowers and other lawn and garden appliances are becoming increasingly important to lawn and garden care. A major reason for this is that environmental restrictions are increasingly requiring less emissions from lawn appliances. These restrictions can, or may eventually, preclude the utilization of conventional internal combustion engines. This provides an environment which is conducive to electric powered devices.

SUMMARY OF THE INVENTION

It is an object of the present invention to simplify the construction of electric powered appliances.

It is another object of the present invention to simplify the design of electric powered appliances.

It is still another object of the present invention to lower the costs of electric powered appliances.

It is yet another object of this invention to simplify the operation of electric powered appliances.

Still other benefits and advantages of the invention will become apparent to those skilled in the art upon a reading and understanding of the following detailed specification.

BRIEF DESCRIPTION OF THE DRAWINGS

The invention may take physical form in certain parts and arrangement of parts. A preferred embodiment of these parts will be described in detail in the specification and illustrated in the accompanying drawings, which form a part of this disclosure and wherein.

DESCRIPTION OF THE PREFERRED EMBODIMENT

Figure 1:
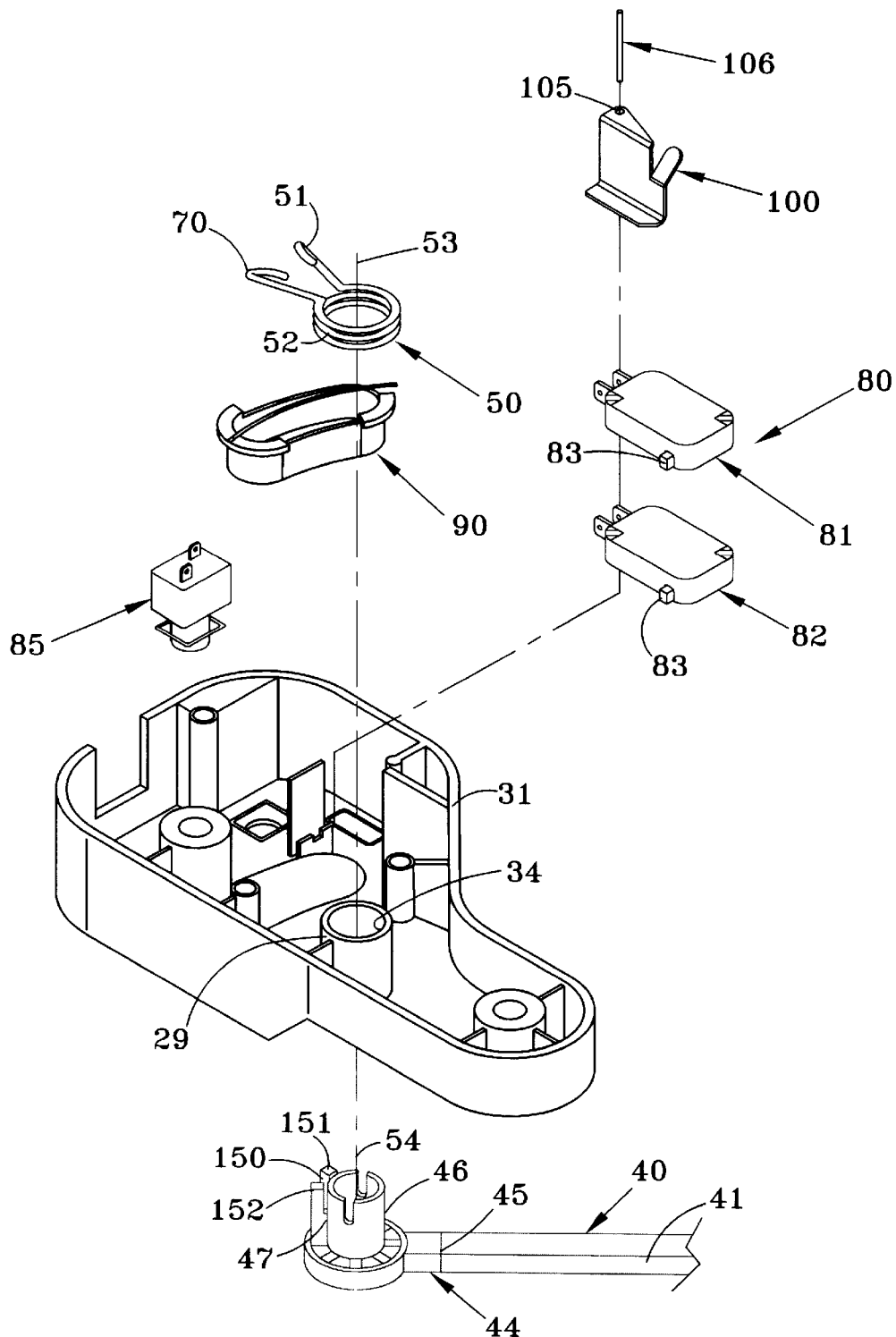
FIG. 1 is a perspective view of the preferred embodiment of the invention illustrating the actuator and switch.
Figure 2:
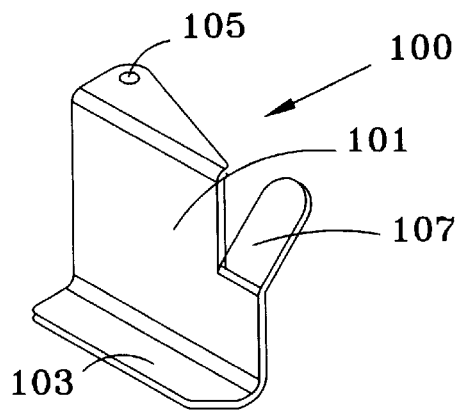
FIG. 2 is a perspective view of the actuator of FIG. 1.
Figure 3:
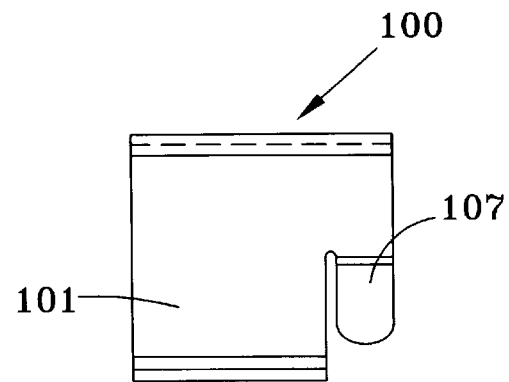
FIG. 3 is a top view of the actuator of FIG. 1.
Figure 4:
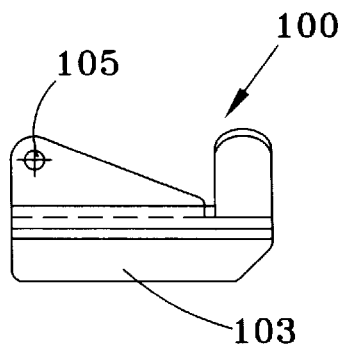
FIG. 4 is a front view of the actuator of FIG. 1.
Figure 5:
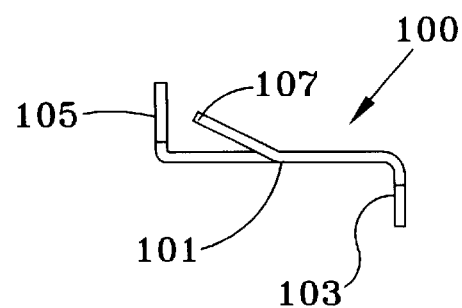
FIG. 5 is an end view of the actuator of FIG. 1.

The invention will be described in its preferred embodiment of a switch for a powered electric lawn mower incorporating an operator presence bail 40. Other ground care devices, such as blowers, vacuums, edgers, etc. can utilize this invention. In addition, power sources other than a source of alternating current electricity, for example a source of direct current electricity or batteries, are also within the scope of this invention.

The particular lawn mower disclosed includes a housing (not shown), a motor (not shown), and a switch mechanism 30. The switch mechanism 30 is designed to incorporate the specific invention of the present application.

The housing is designed to hold the motor and rotary blade in position with respect to the vegetation being cut in addition to dispersing the same over the traversed field and/or bagging means. The particular housing disclosed is a mulching housing.

The motor is intended to provide the power for the blade within the housing. The blade cuts the vegetation. The preferred motor is a powered electric motor (typically 110 or 220 volts, 50 or 60 cycles A.C.) Customarily, with electric lawn mowers, there is some sort of switch that allows the selective activation of the motor and the cutting of vegetation under the housing based upon the position of the switch. Due to regulatory restrictions, it is preferred that the motor not operate until these restrictions are met. One such regulatory restriction is that the operator be present behind the handle bars. Therefore, these electric lawnmowers have a bail which requires the operator's presence. The motors are activated by the bail in addition to a separate manual "on" switch.

By selectively manipulating the bail from the operator's position one can activate the motor. Upon releasing the bail, the operation of the motor ceases. Mowers typically also incorporate a secondary interlocking control that must be manually set prior to manipulation of the bail to avoid unintentional operation.

These mower controls have many moving parts and a number of biasing springs, all of which increase the cost and complexity of the controls. In devices with interlocking controls, it is possible to move the bail without manipulating the secondary interlocking control. The secondary interlocking control can physically damage some devices.

The electric motor switch of U.S. application Ser. No. 08/577,476 filed Nov. 14, 1995, now U.S. Pat. No. 5,588,390 is one of the simplest of mower controls, the contents of which are included by reference. This switch uses an alignment piece between the activated and non-activated positions of the switch. Further, the switch is a break-before-make in order to minimize the possibility of "shorting out." The switch also eliminates the possibility of total independent operation of two circuits (brake/not shown—i.e. the circuit includes a common wire with the attendant complications.) This construction adds pieces and expense to the construction of the unit while restricting the order and timing of the actuation of controls in comparison to the present invention.

The present invention is an improvement to the prior design mentioned above. The present invention provides a switch mechanism 30 with few parts, including a multiple function spring 50. In addition, the order and timing of activating the controls is less restricted than previous designs.

The switch mechanism 30, while including a secondary interlocking control, has an associated bail 40 that can be moved at any time between positions anywhere along its arc of movement without physically damaging the switch mechanism or any of its components.

In the present invention, there is a multiple function spring 50, which: 1) biases the bail 40 in an inactivating condition; 2) biases the secondary interlocking control (later described button 90) outwardly into an inactivated condition; and further, 3) serves to toggle the electric switch 80 between "on" and "off" states. This reduces the number of parts for the control while simplifying its construction.

Figure 6:
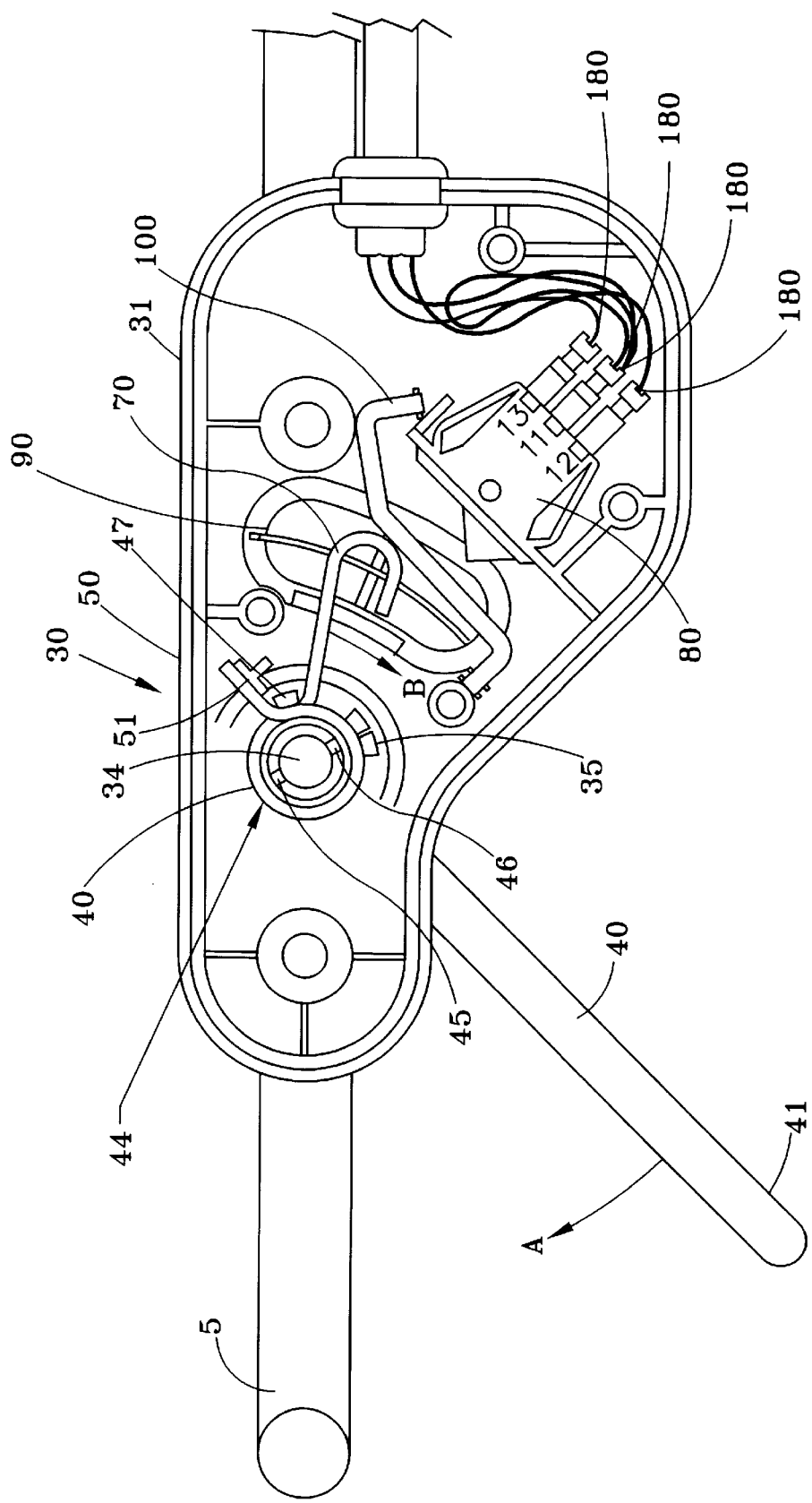
FIGS. 6 and 7 are perspective views of the device of the present invention.
Figure 7:
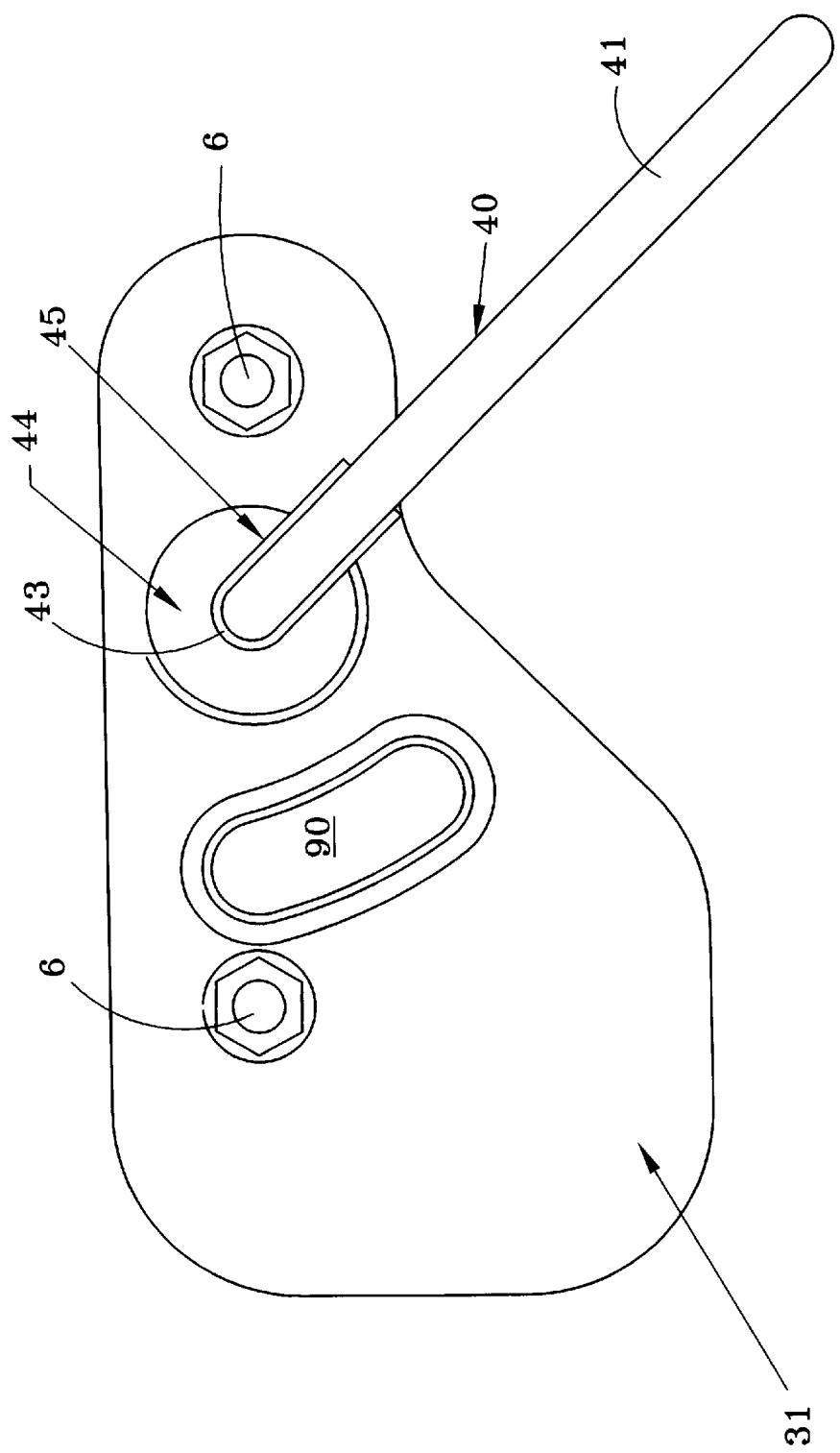

With reference to FIG. 6, the environment of this switch mechanism 30 is constructed of a molded two-piece plastic case 31. The case 31 serves to retain the parts of the switch 30 in their operative positions with respect to each other as well as providing some environmental protection. The handle bars 5 along with bolts 6 retain the case 31 in its proper position. The bolts 6 extend through holes 7 of the case 31. Preferably, glue rivets and/or small screws hold the case 31 together as a single unit before the bolts 6 are inserted. Therefore, the switch 80 and its contained parts can be assembled at a location and/or time different than its point of installation on the mower without concern for losing or misaligning parts. The case 31 includes mounting positions for the bail 40, the multiple function spring 50, the interlock button 90, the actual switch 80, and an actuator 100.

The bail 40 is the manual operator presence sensor for the mower. It is thus something that needs to be selectively manipulated in order for the mower to function. The particular bail 40 disclosed is a metal rod 41 having a large U section 45 with two end pivots 43 (one pivot is shown). The width of the U section 45 is approximately equal to the distance between the inner edge of the case 31 to the opposite handle bar 5. The total width across the pivots is equal to, or slightly more than, the distance from the outer edges of the case 31 to the outer edge of the opposite handle bar 5. This allows the bail 40 to be retained in an operative position and rotated with respect to the handle bars 5.

Preferably, the bail 40 is pivotally mounted to the case 31 and the opposing handle bar 5 with the U section 45 positioned beneath the handle bars 5. This arrangement utilizes the effects of gravity to assist movement of the bail 40 to an inactivated position upon operator release thereof, thus reducing the strength requirements of the spring 50.

The pivotal mounting of the bail 40 to the case 31 includes an intermediate pivot piece 44. The pivot piece 44 is a generally cylindrical-shaped piece of plastic that fits into a correspondingly-shaped cavity 34 in the case 31. This intermediate piece 44 allows for smooth rotation of the bail 40 and allows for an efficient interconnection to the later-described spring 50. Direct connection of the bail 40 to the case 31 is also possible.

The case 31 has an opening 35 that extends for approximately 60° in the cavity 34. This allows for a fork 47 to extend into the opening 35 of the case 31 so as to interconnect the later-described extension 70 of the spring 50 to the pivot piece 44 and thus the bail 40. The other end of the bail 40 extends through a simple equal diameter hole in the opposing handle bar 5 to provide a pivot in a conventional manner.

The bail 40 is fixedly connected to the pivot piece 44, in the embodiment disclosed, via a slot 45 in the end of the bail 40 and a corresponding raised cross member 46 in the pivot piece 44. Glue or other means of interconnection could alternately be used.

The spring 50 performs multiple functions and is itself a split spiral wound spring having an extension 70 at one end and a stub 51 at its other end. Spirals 52 are located between the extension 70 and stub 51. Slot 150 defined by times 151 and 152 of fork 47 receive the extension 70 of the spring 50. The spring 50 is contained within the case 31 having the spirals 52 extending about the inner circumference 29 of the case 31. The axis 53 of the spring 50 corresponds with the axis 54 of the raised member 46. This correspondence, and the fact that the spring 50 is interconnected with the bail 40 through the pivot piece 44, maintains the bail 40 in an unstressed condition without actuation of switch 80. The bail 40, and thus the extension 70, can be moved throughout its full extent without any actuation of the switch 80.

There is, however, in the preferred embodiment of the invention, a button 90 and an actuator 100. The button 90 selectively causes movement of the extension 70 of spring 50 axially of the axis 53 of spring 50. This movement causes the extension 70 to contact the actuator 100 therefore toggling the switch 80 between active and inactive positions. In the preferred embodiment, the reason for the selective activation of the switch 80 is due in part to the actuator 100. The extension 70 of the spring 50 reacts with the movement of the button 90 and causes extension 70 to interact with the actuator 100.

The actuator 100 is an intermediate piece located between the extension 70 of the spring 50 and the later-described switch 80. The actuator 100 serves to mechanically interconnect the spring 50 and the switch 80. It also compensates for any misalignment of the spring 50 and switch 80. In the preferred embodiment, the actuator 100 allows for the utilization of two micro switches 81, 82 instead of a single switch and provides for individual sequential operation of such two micro switches instead of a simultaneous operation.

The particular actuator 100 shown is a substantially "L" shaped piece of stamped metal. It includes an engagement surface 101, a ledge 103, a pivot 105 and a tab 107.

The engagement surface 101 provides a surface of contact for the extension 70 of the spring 50. Due to the significant height of this surface the positioning of the extension 70 at point of contact is not critical. This provides a measure of tolerance for the amount of button 90 travel and spring 50 positioning, as well as increasing manufacturing and assembly tolerances.

The ledge 103 performs two functions. The first function is to create a differential between active and inactive positions of the device. For example, if the extension 70 is below the ledge 103, which is its normal position, the switch 80 condition is not changed on movement of the bail 40. However, if the extension 70 is above the ledge 103 at the location of such ledge 103, which is the button 90 moved position, the switch 80 condition can be changed on movement of the bail 40.

The second function of the ledge 103 is to retain the extension 70 against the engagement surface 101 on release of the button 90 during constant activated positioning of the bail 40. Note that as soon as the bail 40 is moved sufficiently to release the extension 70 from the ledge 103, the extension will drop to its normal positioning below the ledge 103. Therefore, the button 90 needs to be pushed to move the extension 70 above the ledge 103 before the engagement of switch 80 can occur again. This quick release encourages the operator to maintain a good grip on the bail 40.

The pivot 105 movingly interconnects the actuator 100 to the housing 31. In the preferred embodiment, this interconnection is a pivot 106, for reasons described later.

The tab 107 is an optional feature that controls the sequences of operation of the preferred two micro-switch embodiment. Specifically, in the preferred embodiment a normally closed braking switch 81 is utilized in conjunction with a normally open motor run switch 82. Simultaneous activation of these two switches is not preferred. The tab 107 will open the brake switch 81 before it closes the run switch 82. This is because the tab 107 is located closer to the operating plunger 83 of switch 81 than the engagement surface 101 is to the plunger of switch 82. The switch 80 will thus operate in sequence. Differing numbers of switches, tab positioning and orientation would provide for other operations.

In the embodiment disclosed, a circuit breaker 85 is utilized to avoid overload conditions. The particular actuator is made of 1050/70, 0.0250 thick spring steel heat treated to RC 45–50 and then finished with phosphate and oil. The piece itself has an engagement surface 101 of approximately 1 inch long by 0.78 inches high with the 0.275 inch (ledge 103) and 0.31 inch (pivot 105) extending therefrom. The tab 107 is 0.295 inches in length beginning about 0.40 inches from the bottom of the pivot and offset at 10° toward the pivot 105 from the engagement surface 101.

The particular micro-switches disclosed 81, 82 are standard single-pole double-throw units, with the conditions controlled by a small plunger 83 in each. In that each switch 80 has its own wires 180 leading thereto, and each switch 80 has normally open and normally closed positions, the switch 80 is very adaptable to differing applications. Further, by alternating the number and type of switches and the actuator shape, removing the tab, using a reverse tab, having a smaller ledge, etc., the design is very adaptable.

The operation of the actuator 100 is under the control of the button 90. In the absence of the actuation of the button 90, the extension 70 will bypass the actuator 100 passing under the ledge 103 and thus will not activate the switch 80.

Upon actuation of the button 90, the extension 70 is physically relocated above the ledge 103 to contact the actuator 100. The movement of the bail 40 in the direction indicated by arrow A (FIG. 6) causes the extension 70 of the spring 50 to move in the direction indicated by arrow B and to interact with the actuator 100, and thus the switch 80, to cause the actuation of the switch 80. Thus, the position of the button 90 interacts with the positioning of the bail 40 to activate or inactivate the switch 80 and to control the operational status of the mower 10.

Due to the limited extent of the ledge 103, the button 90 can be pressed and/or released at almost any time during movement of the bail 40 without interference. When the extension 70 reaches the ledge 103, operation is curtailed if the extension 70 is under the ledge 103 and functioning is curtailed if the extension 70 is above the ledge 103.

The spring 50 and its extension 70 biases the bail 40 into its inoperative position and provides for the activation or inactivation of the related mower blade. Therefore, the button 90 and actuator 100 control the operation of the mower. In this respect it is noted that bail 40 can be moved from an inactive to an active position with no effect on the operational status of the mower. More specifically, it is necessary for the button 90 to be pressed from an inactive to an active condition before the mower will actually function as a vegetation cutting unit. Without actuation of the button 90, the bail 40 can be moved, but no active cutting action will be produced by the mower and no physical harm will be occasioned to the control mechanism.

The invention of this application can be modified to suit various purposes. An example would be to make the button 90 much smaller, perhaps a circular cross sectioned member, located immediately adjacent the leading edge of the ledge 103. Although this would necessitate a separate return spring for such button 90, the button 90 is itself limited to the exact position necessary for switch 80 activation. This produces an instinctive operation for the device.

Although this invention has been described in its preferred mode with a certain degree of particularity, it is to be understood certain changes can be made without deviating from the invention as hereinafter claimed.

I claim:

1. An electric lawn care device comprising:
   a driven member;
   a motor for driving said driven member;
   a switch for selectively switching power to said motor;
   an actuator operatively connected to said switch for selectively actuating said switch;
   a bail operatively connected to said actuator, said bail moveable between first and second positions, said bail causing said actuator to actuate said switch when said bail is in said second position; and,
   a spring, said spring biasing said bail to said first position, said spring interconnecting said bail to said actuator, said spring comprising:
      an extension (70), said extension (70) engaging said actuator and causing said actuator to actuate said switch when said bail is in said second position;
   said actuator comprising:
      an engagement surface, said extension engaging said actuator at said engagement surface; and,
      a barrier, said barrier selectively preventing said extension from engaging said engagement surface;
   said bail comprising:
      a slot for receivingly interconnecting said extension to said bail.

2. The device of claim 1 further comprising:
   a button operatively connected to said extension wherein selective movement of said button by a user of said device selectively causes said extension to overcome said barrier.

3. The device of claim 2 wherein said barrier comprises:
   a ledge juxtaposed between said engagement surface and said extension.

4. The device of claim 2 further comprising:
   a frame, said actuator being pivotably connected to said frame.

5. The device of claim 1 wherein said switch comprises:
   a normally closed brake switch; and,
   a normally open run switch, said actuator actuating said switch by opening said normally closed brake switch and closing said normally open run switch.

6. The device of claim 5 wherein said actuator comprises:
   a tab, said tab selectively opening said normally closed brake switch prior to said actuator selectively closing said normally open run switch.

7. An electric lawn care device comprising:
   a driven member;
   a motor for driving said driven member;
   a switch for selectively switching power to said motor;
   an actuator operatively connected to said switch for selectively actuating said switch, said actuator having an engagement surface;
   a bail operatively connected to said actuator, said bail moveable between first and second positions, said bail causing said actuator to actuate said switch when said bail is in said second position;
   a spring comprising an extension, said spring interconnecting said bail to said actuator and biasing said bail to said first position, said extension engaging said actuator at said engagement surface and causing said actuator to actuate said switch when said bail is in said second position;
   a barrier, said barrier selectively preventing said extension from engaging said engagement surface; and,
   a button operatively connected to said extension wherein selective movement of said button by a user of said device selectively causes said extension to overcome said barrier.

8. The device of claim 7 wherein said switch comprises:

a normally closed brake switch; and, a normally open run switch, said actuator actuating said switch by opening said normally closed brake switch and closing said normally open run switch.

9. The device of claim 8 wherein said actuator comprises:

a tab, said tab selectively opening said normally closed brake switch prior to said actuator selectively closing said normally open run switch.

* * * * *